March 5, 1940.  E. K. MEAD  2,192,750
CLOCK TIME SUNDIAL
Filed Nov. 21, 1938  4 Sheets-Sheet 1

EVERETT K. MEAD
INVENTOR.

BY *[signature]*

ATTORNEY.

March 5, 1940.  E. K. MEAD  2,192,750
CLOCK TIME SUNDIAL
Filed Nov. 21, 1938  4 Sheets-Sheet 3

EVERETT K. MEAD
INVENTOR.
BY John M. Spellman
ATTORNEY.

March 5, 1940.  E. K. MEAD  2,192,750
CLOCK TIME SUNDIAL
Filed Nov. 21, 1938  4 Sheets-Sheet 4
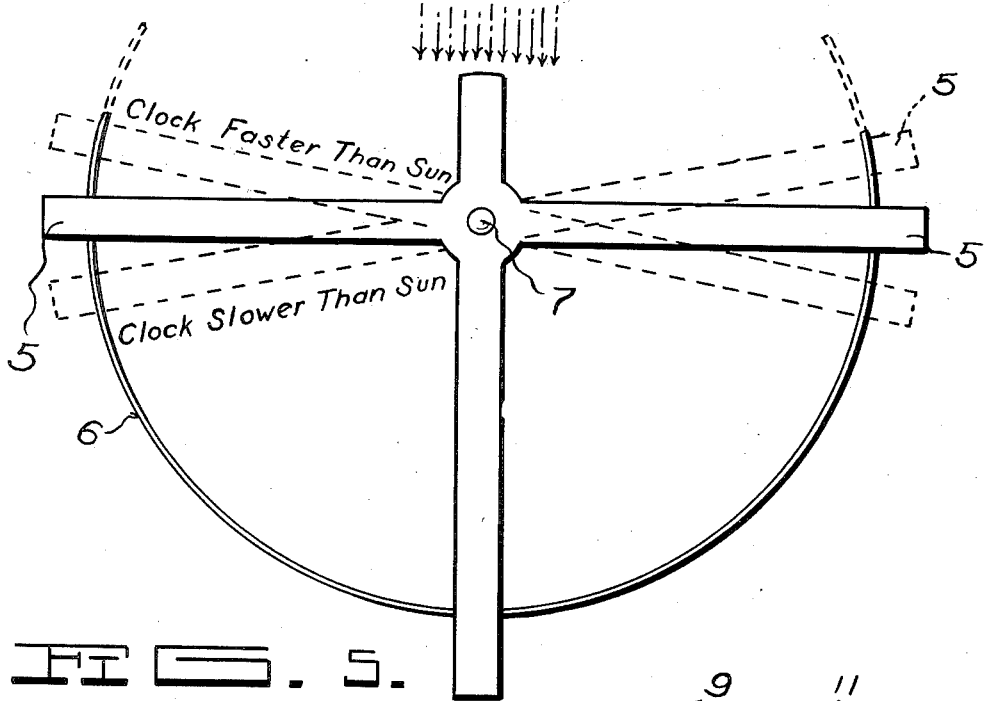
FIG. 4.
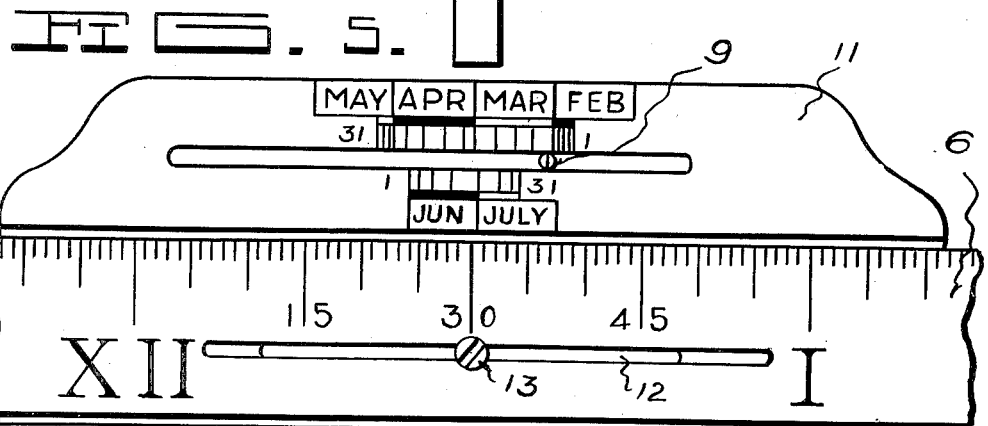
FIG. 5.
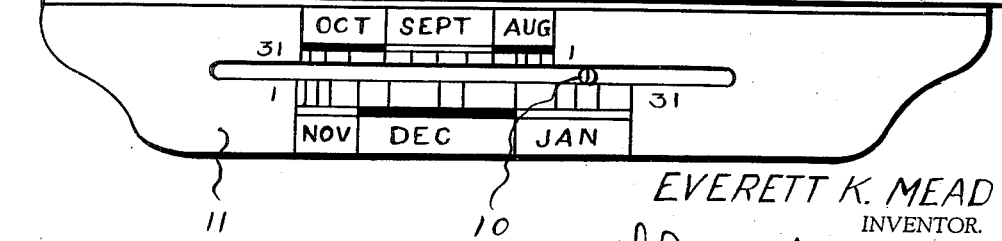
EVERETT K. MEAD
INVENTOR.
BY *John M Spellman*
ATTORNEY.

Patented Mar. 5, 1940

2,192,750

UNITED STATES PATENT OFFICE 2,192,750

CLOCK TIME SUNDIAL

Everett K. Mead, Dallas, Tex.

Application November 21, 1938, Serial No. 241,658

1 Claim. (Cl. 33—62)

This invention relates to sundials and it has particular reference to a sundial by which an observer may determine accurately the clock time instead of the sun time.

The principal object of the invention is to provide a clock time sundial which is adjustable to any latitude, longitude or time zone.

Another object of the invention is to provide a sun dial which will give accurate clock time through all seasons of the year, even day-light saving time if so desired.

Another object of the invention is to provide a sundial which may be readily adjusted to any locality on earth and set to conform with the clock time used in that locality.

Still another object of the invention is to provide a sundial of the armillary sphere type representing the great circles of the celestial globe, with portions of them being cut away to prevent obstruction of the sun's rays.

Yet another object of the invention is to provide an analemma scale which shows the proper setting of the time band for each week of the year.

Still another object of the invention is to provide an analemma scale which is readily adjustable to the proper longitudinal position on the time band.

A still further object of the invention is to provide a sundial which is rugged in construction and which may be arranged to have a definite artistic appeal.

Figure 1:
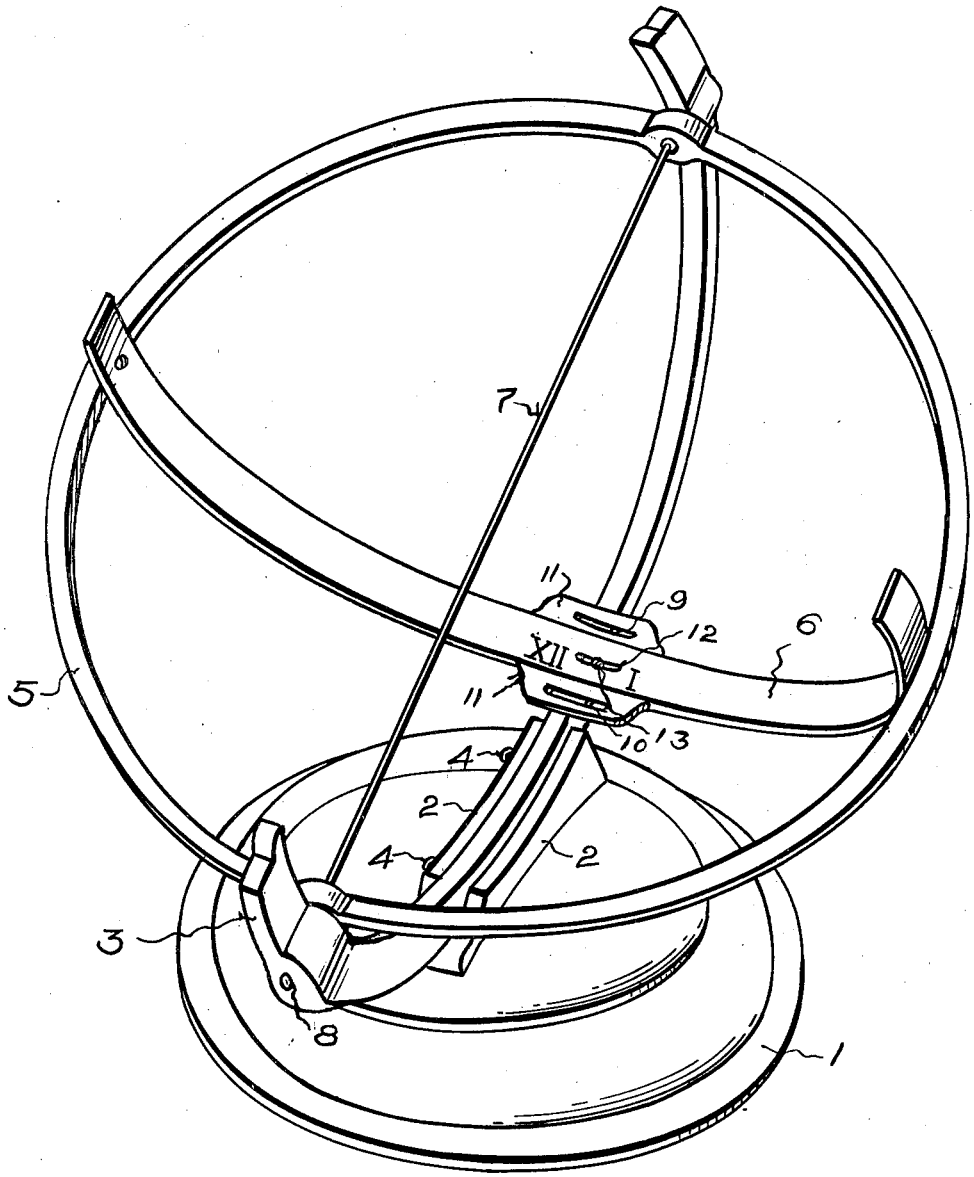
Figure 2:
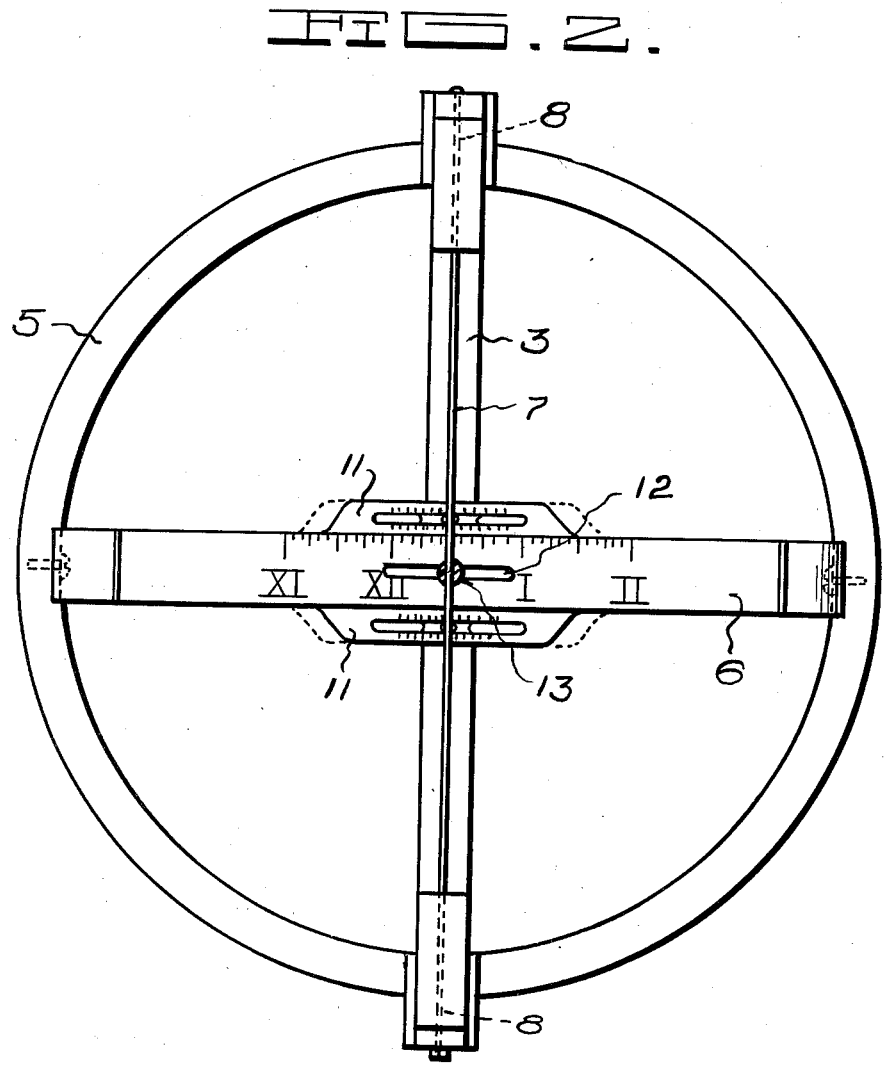
Figure 3:
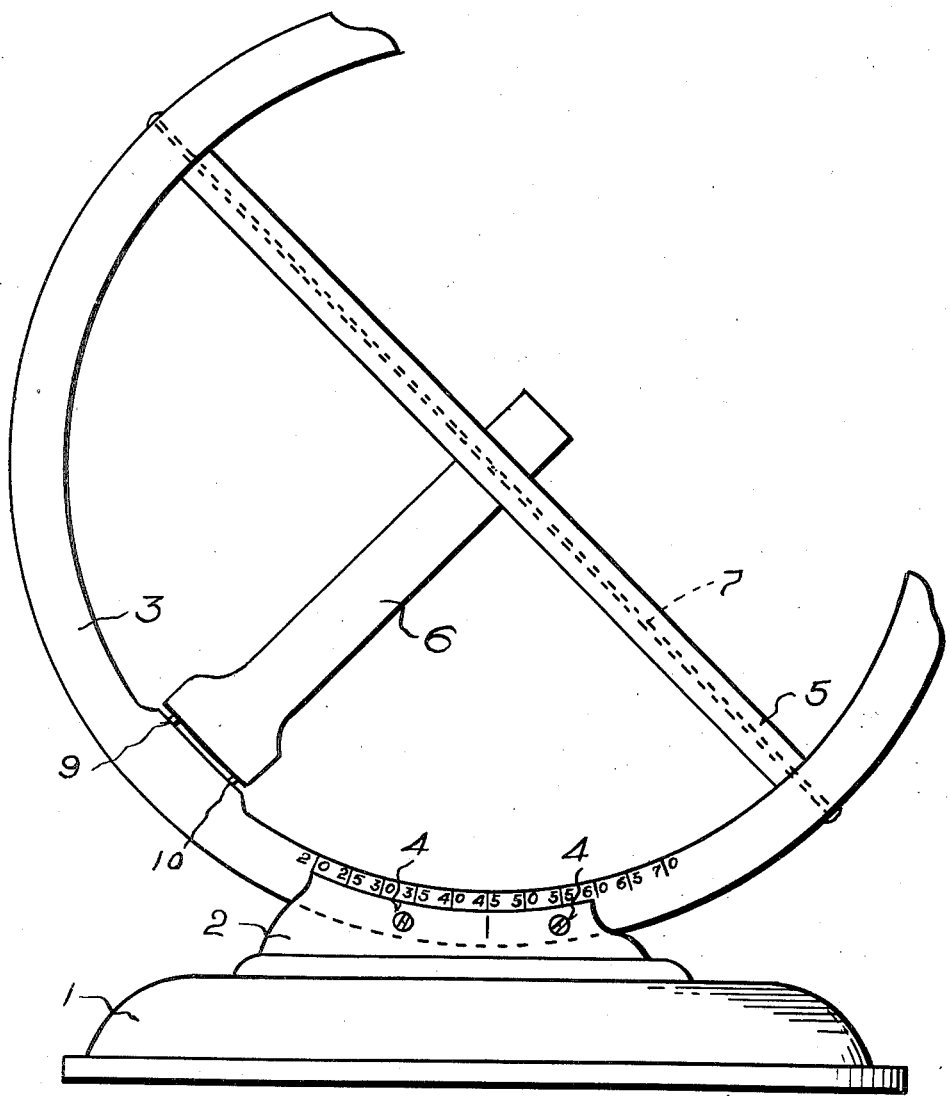

With the foregoing objects as paramount, the invention has particular reference to its salient features of construction which will become manifest as the description proceeds taken in connection with the accompanying drawings wherein, Figure 1 is a perspective view of the clock time sundial, Figure 2 is a plan view showing the gnomon, analemma scale and time band in relation to other parts of the dial, Figure 3 is a side elevational view of the assembled dial set for 45° latitude.

Figure 4 is a view showing the adjustment of the dial for the times when the clock time is faster or slower than the sun time, and Figure 5 is an enlarged view of the analemma scale shown in its relationship to the time band, the latter band being shown fragmentarily.

Construction of dials that accurately record sun time is a simple matter, understood by dial makers for many centuries. A dial, however, which will give accurate clock time through all seasons of the year and which is adjustable to any latitude, longitude or clock time zone, necessarily involves mechanical and astronomical complications.

The present invention contemplates a sundial of the armillary sphere type. Instead of being rigid as are most dials of this type, the time band on the equatorial circle is movable, being attached to a ring which pivots at the poles. An analemma scale is so arranged that the proper setting of the time band may be made for each week of the year.

When the dial is accurately mounted so that the gnomon is parallel to the earth's axis, and the analemma scale is set to the proper longitude with relation to the time zone meridian, it is possible for the observer to read correct clock time within one minute on the time band by setting it by the analemma scale to the proper day of the year.

The variations of clock time and solar time through the seasons of the year are usually listed on charts attached to fixed dials, which charts show how many minutes should be added or subtracted to find the correct clock time. The movable time band on the dial does away with the bothersome necessity of making mental calculations and enables the observer to read clock time directly from the shadow of the gnomon on the time band since the calculations are already worked out on the analemma scale.

When the clock time is faster than the sun time, the time band must be moved in the proper direction to the position indicated on the analemma scale, and vice versa. It has been found that only the weeks of the year need be shown since the time changes by days are too trivial for concern. If day-light saving time is desired, the analemma scale must be moved up sixty minutes.

Figure 3 illustrates the position of the dial assembly as it would appear viewed from the west and mounted for 45° latitude.

A base 1 is provided with integrally formed upturned portions 2 which serve to support a ring segment 3. This ring segment is rigidly locked in a predetermined position by means of set screws 4. The position in which the ring segment 3 is locked is determined by the latitude in which the dial is positioned. A ring 5 serves as a support for a time band 6, which ring is mounted inside of and at right angles to the ring segment 3.

The gnomon 7 is preferably comprised of a taut wire, which wire is strung through hollow pivots 8, and is suitably secured at its ends.

Two fixed guide pins 9 and 10 are mounted on the ring segment 3 and protrude through slots in the analemma scale 11. These guide pins serve as indicators on the analemma.

Figure 2 shows the ring 5, time band 6, and ring segment 3 as viewed from the sun's position at the meridian. A central slot 12 in the time band 6 permits the analemma 11 to be set and locked into place with a set screw 13 at the proper longitude position. For example, Dallas, Texas, is 27 minutes west of the central zone meridian. It is necessary in Dallas to set the analemma zero point 27 minutes to the right of noon on the time band or at 12:27 p. m. Thus when the sun is on the central standard time zone meridian, the shadow of the gnomon will fall on 12 o'clock in Dallas.

Figure 4 shows the assembly as viewed from the northern polar axis and indicates how the ring 5 is turned to move the time band to the day shown on the analemma 11 for correct clock time. When the clock is faster than the sun, the time band 6 must be moved in the direction shown to the position indicated on the analemma scale and vice versa.

Figure 5 is a detailed drawing of the analemma scale and a portion of the time band 6. It is shown as placed for central standard time, Dallas longitude. As has been pointed out it will be noted that only the weeks of the year are shown, since daily time changes are too small in magnitude for concern.

What I claim is:

A clock time sundial comprising a base, a ring segment having fixed guide pins and adjustably mounted on the base; a ring having hollow bearings, a time band segment supported upon and inside of said ring segment; a central slot in said time band segment, and set screws; a gnomon; and an analemma scale with slots in which said guide pins on the ring segment protrude and providing indicators for the analemma; said gnomon consisting of a taut wire secured by its ends in the hollow bearings of said ring.

EVERETT K. MEAD.